(12) United States Patent
Sakayanagi et al.

(10) Patent No.: US 9,816,446 B2
(45) Date of Patent: Nov. 14, 2017

(54) KNOCK DETERMINATION APPARATUS FOR INTERNAL COMBUSTION ENGINE

(71) Applicants: TOYOTA JIDOSHA KABUSHIKI KAISHA, Toyota-shi, Aichi-ken (JP); FUJITSU TEN LIMITED, Kobe-shi, Hyogo-ken (JP)

(72) Inventors: Yoshihiro Sakayanagi, Mishima (JP); Sumiaki Hashimoto, Kobe (JP)

(73) Assignees: TOYOTA JIDOSHA KABUSHIKI KAISHA, Toyota-shi (JP); FUJITSU TEN LIMITED, Kobe-Shi (JP)

( * ) Notice: Subject to any disclaimer, the term of this patent is extended or adjusted under 35 U.S.C. 154(b) by 0 days.

(21) Appl. No.: 14/929,895

(22) Filed: Nov. 2, 2015

(65) Prior Publication Data

US 2016/0123249 A1 May 5, 2016

(30) Foreign Application Priority Data

Nov. 4, 2014 (JP) ................................. 2014-224397

(51) Int. Cl.
*F02D 35/02* (2006.01)
*G01L 23/22* (2006.01)
(Continued)

(52) U.S. Cl.
CPC ......... *F02D 35/027* (2013.01); *F02D 35/023* (2013.01); *G01L 23/22* (2013.01);
(Continued)

(58) Field of Classification Search
CPC ........ G01L 23/22; G01L 23/225; F02P 5/152; F02D 35/027
(Continued)

(56) References Cited

U.S. PATENT DOCUMENTS 4,356,551 A * 10/1982 Iwase .................... F02P 5/1522
  123/435
4,699,106 A  10/1987 Haraguchi et al.
(Continued)

FOREIGN PATENT DOCUMENTS

CN   1796753 A    7/2006
CN  103573455 A   2/2014
(Continued)

OTHER PUBLICATIONS

English machine translation of JP 58007538 A provided by JPLAT.*

*Primary Examiner* — Jacob Amick
*Assistant Examiner* — Michael A Kessler
(74) *Attorney, Agent, or Firm* — Andrews Kurth Kenyon LLP

(57) ABSTRACT

A knock determination apparatus for an internal combustion engine calculates a knock intensity based on an output signal of an in-cylinder pressure sensor in a gate range for knock determination. When the calculated knock intensity is larger than a knock determination threshold value, the knock determination apparatus determines that knock has occurred. Further, the knock determination apparatus calculates an integrated intensity which is an integrated value of knock intensities that are equal to or larger than a knock intensity at a point of 97% or more in a target knock level among knock intensities that are calculated at the respective cycles during continuous N cycles in the same cylinder. Furthermore, the knock determination apparatus corrects a knock determination threshold value so that the difference between the calculated integrated intensity and a target integrated intensity becomes small.

4 Claims, 5 Drawing Sheets

(51) Int. Cl.
*G01H 17/00* (2006.01)
*F02D 41/24* (2006.01)
*F02D 41/14* (2006.01)

(52) U.S. Cl.
CPC ........ G01L 23/225 (2013.01); *F02D 41/2441* (2013.01); *F02D 41/2451* (2013.01); *F02D 2041/1432* (2013.01); *G01H 17/00* (2013.01)

(58) Field of Classification Search
USPC .................. 123/406.37–406.38; 701/111
See application file for complete search history.

(56) References Cited

U.S. PATENT DOCUMENTS

| | | | |
|---|---|---|---|
| 4,711,212 A | 12/1987 | Haraguchi et al. | |
| 7,212,912 B2* | 5/2007 | Okubo | G01L 23/225 701/111 |
| 7,500,468 B2* | 3/2009 | Kaneko | G01L 23/225 123/406.29 |
| 2002/0179053 A1 | 12/2002 | Kokubo et al. | |
| 2005/0234633 A1 | 10/2005 | Takemura et al. | |
| 2006/0086177 A1 | 4/2006 | Okubo et al. | |
| 2011/0259298 A1* | 10/2011 | Imamura | F02B 19/108 123/436 |
| 2013/0166183 A1 | 6/2013 | Matsushima et al. | |
| 2014/0041439 A1 | 2/2014 | Matsushima | |

FOREIGN PATENT DOCUMENTS

| | | | |
|---|---|---|---|
| JP | 58007538 A * | 1/1983 | |
| JP | S61-241463 A | 10/1986 | |
| JP | Sho62-126244 A | 6/1987 | |
| JP | S64-41667 | 2/1989 | |
| JP | H03-164552 A | 7/1991 | |
| JP | H04-503710 A | 7/1992 | |
| JP | 2003-021032 A | 1/2003 | |
| JP | 2005-307753 A | 11/2005 | |
| JP | 2007-009734 A | 1/2007 | |
| JP | 2008-157087 A | 7/2008 | |
| JP | 2011-179321 A | 9/2011 | |
| JP | 2012-163078 A | 8/2012 | |
| JP | 2013-133710 A | 7/2013 | |
| WO | 90/15243 A1 | 12/1990 | |

* cited by examiner

Fig. 3
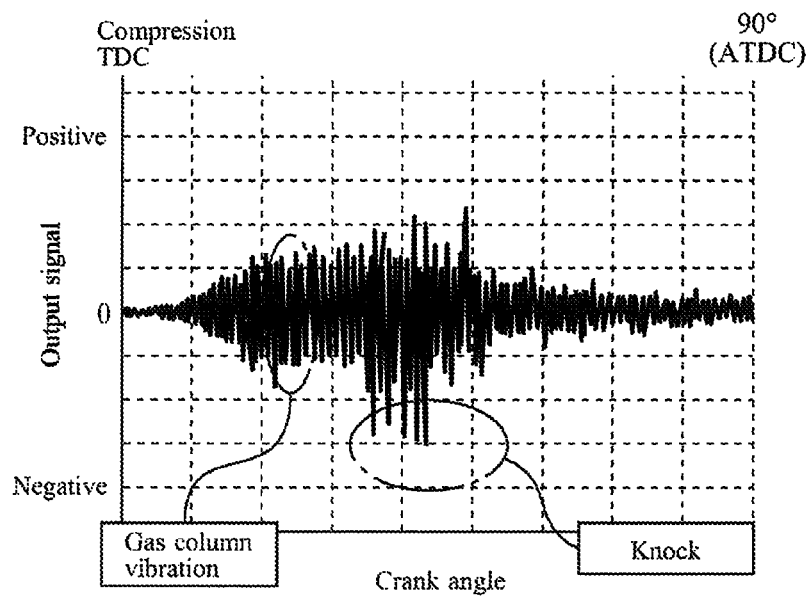
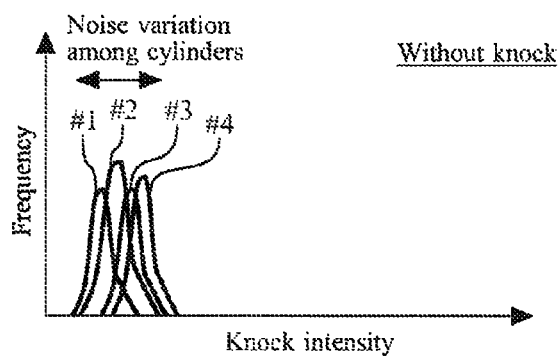
Fig. 4A
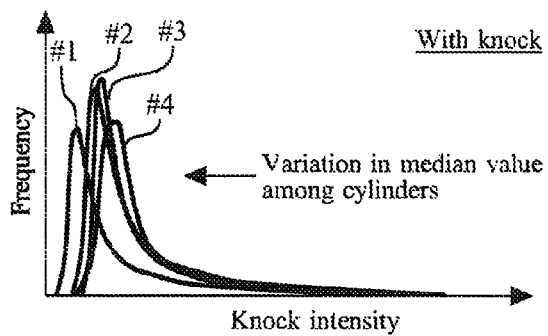
Fig. 4B

KNOCK DETERMINATION APPARATUS FOR INTERNAL COMBUSTION ENGINE

CROSS-REFERENCE TO RELATED APPLICATION

The present application claims priority to Japanese Patent Application No. 2014-224397 filed on Nov. 4, 2014, which is incorporated herein by reference in its entirety.

BACKGROUND

Technical Field

The present application relates to a knock determination apparatus for an internal combustion engine, and in particular to a knock determination apparatus for an internal combustion engine that performs knock determination by using an in-cylinder pressure sensor.

Background Art

There has been disclosed a control device for an internal combustion engine that performs knock control by using a knock sensor, in Patent Literature 1, for example. In the control device, vibration intensity values are calculated based on the output signals from the knock sensor, and a frequency distribution concerning the intensity values and the numbers (frequencies) of the respective intensity values is used in knock determination. More specifically, a median value V (50) and a standard deviation σ of the intensity values in the frequency distribution are calculated. Subsequently, a value obtained by adding 3σ to the median value V (50) is used as a knock determination level V (KD) for knock determination.

LIST OF RELATED ART

Following is a list of patent literatures which the applicant has noticed as related arts of the present invention.
[Patent Literature 1]
　Japanese Patent Laid-Open No. 2007-009734
[Patent Literature 2]
　Japanese Patent Laid-Open No. 2003-021032
[Patent Literature 3]
　Japanese Patent Laid-Open No. 2013-133710
[Patent Literature 4]
　Japanese Patent Laid-Open No. 2008-157087
[Patent Literature 5]
　Japanese Patent Laid-Open No. 2012-163078
[Patent Literature 6]
　Japanese Patent Laid-Open No. 03-164552

TECHNICAL PROBLEM

The knock determination method described in Patent Literature 1 is the method which is intended for knock sensors. Since the frequency components derived from knock can be also acquired by using an in-cylinder pressure sensor, and therefore, the output signals from the in-cylinder pressure sensor can be also used in knock determination. However, the above described method cannot be said as suitable for knock determination that uses an in-cylinder pressure sensor for the following reason. That is to say, unlike the knock sensor that directly detects the vibration of an engine block, the output signal from the in-cylinder pressure sensor is susceptible to an influence of gas column vibration in the cylinder. When knock determination is performed by using the in-cylinder pressure sensor, the gas column vibration becomes a main noise source. Due to the influence of the noise (the gas column vibration), the median value of the frequency distribution varies. Further, the dynamic range of an in-cylinder pressure sensor is generally smaller than that of a knock sensor. Therefore, the in-cylinder pressure sensor is more susceptible to the influence of electric noise as compared with the knock sensor, and this also becomes the factor that causes the median value of the frequency distribution to easily change. The variation of the median value due to the influence of these noises may occur among cylinders due to the influence of noise varying among the cylinders. Accordingly, if the above described knock determination level V (KD) which is a relative value with the median value as the reference is used as a knock determination threshold value in a case of using an in-cylinder pressure sensor, the knock determination threshold value varies to a large degree due to the influence of noises. As a result, it becomes difficult to perform accurate knock determination in the respective cylinders.

SUMMARY

The present application addresses the problem as described above, and has an object to provide a knock determination apparatus for an internal combustion engine that allows a parameter with which a noise component and a knock component can be separated from each other to be used for knock determination, and enables accurate knock determination to be performed while suppressing the number of adaptation steps for knock determination.

A knock determination apparatus for an internal combustion engine according to an embodiment of the present application is provided for an internal combustion engine that includes an in-cylinder pressure sensor. The in-cylinder pressure sensor is installed in each cylinder and detects an in-cylinder pressure. The knock determination apparatus is configured to: calculate a knock intensity that is a signal intensity in a predetermined frequency band including a knock frequency band, based on an output signal from the in-cylinder pressure sensor in a predetermined crank angle range; determine that when the knock intensity calculated by the knock determination apparatus is larger than a knock determination threshold value, knock has occurred; calculate an integrated intensity that is an integrated value of knock intensities that are equal to or larger than a predetermined knock intensity threshold value among knock intensities that are calculated at a respective cycles during a predetermined plurality of cycles in a same cylinder; and correct the knock determination threshold value so that a difference between the integrated intensity calculated by the knock determination apparatus and a target integrated intensity becomes small. The predetermined knock intensity threshold value is a knock intensity in a boundary of top predetermined percentage out of knock intensities included in a frequency distribution showing a relation between the knock intensities acquired in the predetermined plurality of cycles when the internal combustion engine is operated in a state in which a knock level specified in accordance with a knock intensity and a knock frequency is a target knock level, and calculation frequencies of a respective knock intensities. The target integrated intensity is an integrated value of knock intensities that are equal to or larger than the knock intensity threshold value that are extracted from the knock intensities which are acquired in the predetermined plurality of cycles when the internal combustion engine is operated in the state in which the knock level is the target knock level.

When the integrated intensity is larger than the target integrated intensity, the knock determination apparatus may be configured to make the knock determination threshold value small.

When the integrated intensity is smaller than the target integrated intensity, the knock determination apparatus may be configured to make the knock determination threshold value large.

The top predetermined percentage is in a range from top 3 percent through top 5 percent.

According to an embodiment, by using the integrated intensity which is obtained with the knock intensities that are equal to or larger than the above described predetermined knock intensity threshold value, a parameter with which a noise component that is caused by, for example, gas column vibration and a knock component are favorably separated from each other can be used in knock determination. Further, according to an embodiment, the knock determination threshold value is corrected so that the difference between the integrated intensity and the target integrated intensity becomes small. Thereby, even in the situation where easiness of occurrence of knock differs among the cylinders due to, for example, the influence of change with the passage of time, if one target integrated intensity common to all the cylinders is set, the integrated intensities calculated in the respective cylinders can be matched with the target integrated intensity, as a result of which, the knock levels of the respective cylinders can be matched with a target knock level. Therefore, the number of adaptation steps can be suppressed.

BRIEF DESCRIPTION OF THE DRAWINGS

FIG. 3 is a diagram showing a waveform of an output signal from an in-cylinder pressure sensor after passing through an HPF;

FIGS. 4A and 4B are diagrams showing frequency distributions of knock intensities;

DETAILED DESCRIPTION

[System Configuration of this Embodiment]

Figure 1:
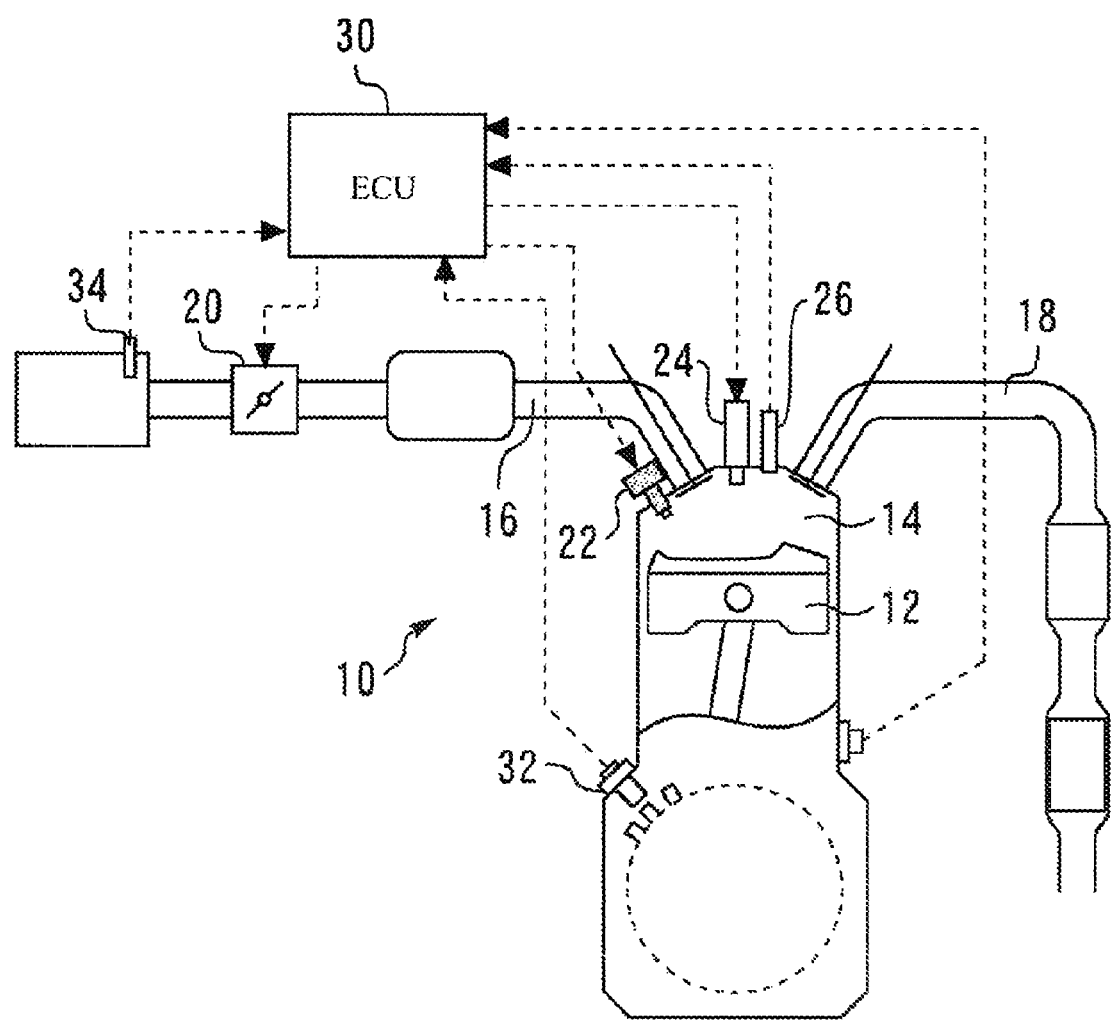
FIG. 1 is a view for explaining a system configuration according to an embodiment of the present invention.

FIG. 1 is a view for explaining a system configuration according to an embodiment of the present invention. The system shown in FIG. 1 includes a spark-ignition type internal combustion engine 10. In each cylinder of the internal combustion engine 10, a piston 12 is provided. At a top portion side of the piston 12 in the cylinder, a combustion chamber 14 is formed. An intake passage 16 and an exhaust passage 18 communicate with the combustion chamber 14.

In the intake passage 16, an electronically-controlled throttle valve 20 is provided. Further, each of cylinders of the internal combustion engine 10 is provided with a fuel injection valve (as one example, a direct injection type fuel injection valve) 22 for supplying fuel into the combustion chamber 14, and an ignition device having an ignition plug 24 (parts other than the ignition plug 24 are not illustrated) for igniting a mixture gas. Furthermore, an in-cylinder pressure sensor 26 for detecting an in-cylinder pressure is incorporated into each of the cylinders.

Further, the system of the present embodiment includes an electronic control unit (ECU) 30. The ECU 30 includes at least an input/output interface, a memory and a central processing unit (CPU). The input/output interface is configured to take in sensor signals from various sensors that are attached to the internal combustion engine 10, and to output operation signals to various actuators that the internal combustion engine 10 includes. The sensors from which the ECU 30 takes in the signals include various sensors for acquiring an operating state of the internal combustion engine 10 such as a crank angle sensor 32 for acquiring a rotational position of a crankshaft (crank angle) and an engine speed, and an air flow sensor 34 for detecting an intake air flow rate, in addition to the in-cylinder pressure sensor 26 described above. The actuators to which the ECU 30 outputs the operation signals include various actuators for controlling the operation of the internal combustion engine 10 such as the throttle valve 20 and the fuel injection valve 22 and the aforementioned ignition device. Various control programs, maps and the like for controlling the internal combustion engine 10 are stored in the memory. The CPU reads the control programs and the like from the memory and executes the control programs and the like, and generates operation signals based on the acquired sensor signals. More specifically, the ECU 30 performs predetermined engine control such as fuel injection control and ignition control. Further, the ECU 30 has a function of acquiring an output signal from the in-cylinder pressure sensor 26 by analog-digital conversion in synchronization with the crank angle. Thereby, in a range which the resolution of the analog-digital conversion, the in-cylinder pressure at an arbitrary crank angle timing can be detected.

[Knock Determination Method of this Embodiment]
(Knock Determination Process Performed at Each Cycle)

Figure 2:
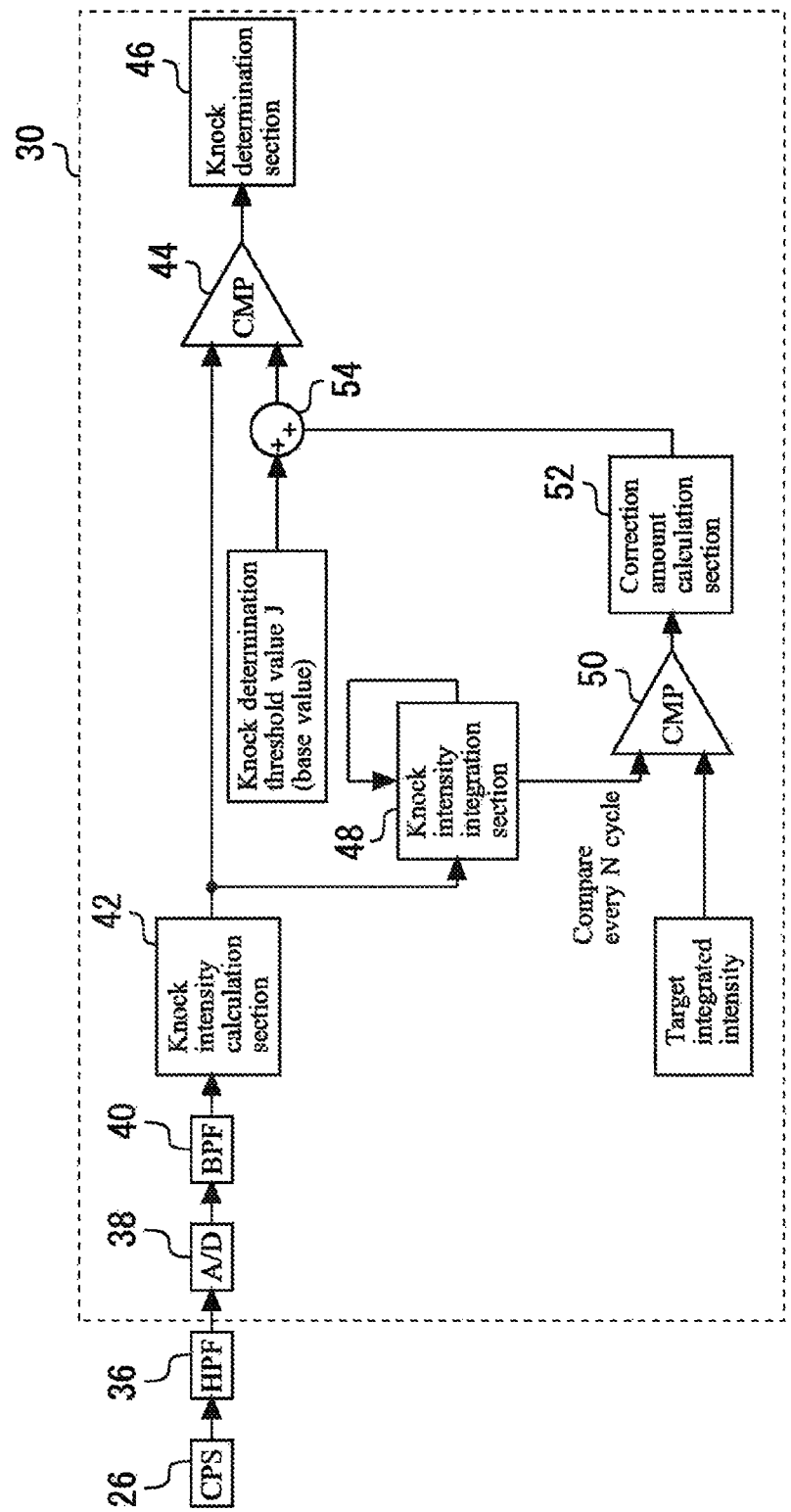
FIG. 2 is a block diagram showing an outline of a knock determination process of the embodiment of the present invention.

FIG. 2 is a block diagram showing an outline of a knock determination process of the embodiment of the present invention. The processing by a configuration shown in FIG. 2 is performed for each of the cylinders of the internal combustion engine 10. The in-cylinder pressure sensors 26 of the respective cylinders are connected to the ECU 30 via a high pass filter (HPF) 36. The HPF 36 removes a predetermined low frequency component which is not related to a knock component from the output signal of the in-cylinder pressure sensor 26. The ECU 30 includes an analog/digital (A/D) convertor 38 and a band pass filter (BPF) 40. A signal (an analog value) that passes through the HPF 36 is taken into the A/D convertor 38. The A/D convertor 38 converts the inputted signal into a digital value. The signal after undergoing digital conversion is sent to the BPF 40. The BPF 40 performs, to the inputted signal, digital filter processing that uses as a pass band a knock frequency band (an audible range) that is a frequency band on which a knock component may be superimposed, and extracts signals in the knock frequency band. Here, explanation is made by taking as an example a filter in which the HPF 36 which is used in the state of an analog signal and the BPF 40 that performs digital filter processing are combined, but both the filters may be configured as digital filters or analog filters. The above described pass band is not limited to the knock frequency band, but may be a predetermined frequency band including the knock frequency band.

The ECU 30 includes a knock intensity calculation section 42, a knock intensity comparison section 44, and a knock determination section 46 as a configuration for performing knock determination at each cycle of the internal combustion engine 10. An output signal from the in-cylinder pressure sensor 26 after passing through the BPF 40 is inputted to the knock intensity calculation section 42. Hereinafter, the output signal from the in-cylinder pressure sensor 26 after passing through the BPF 40 will be described as a "knock determination signal".

The knock intensity calculation section 42 calculates a "knock intensity" that is a peak value of an intensity of the knock determination signal in a predetermined crank angle range (hereinafter, referred to as a "gate range") including a range in which knock is likely to occur. As one example, a range from a compression top dead center to 90° CA after the top dead center applies to the gate range which is mentioned here. Note that the knock intensity may be an integrated value of the intensity of the knock determination signal in the gate range, for example.

The knock intensity comparison section 44 compares the knock intensity which is calculated by the knock intensity calculation section 42 and a predetermined knock determination threshold value J. More specifically, the knock intensity comparison section 44 calculates a difference between the knock intensity and the knock determination threshold value J and outputs the difference to the knock determination section 46. The knock determination section 46 determines presence or absence of knock based on the difference which is calculated by the knock intensity comparison section 44. More specifically, when the knock intensity is larger than the knock determination threshold value J, it is determined that knock has occurred. In this case, ignition timings of the next cycle and the following cycles are retarded with respect to the present value. Thereby, occurrence of knock at a level exceeding the knock determination threshold value J is suppressed. When the knock intensity is equal to or smaller than the knock determination threshold value J, it is determined that knock has not occurred. When determination of non-occurrence of knock continues for a predetermined time period, ignition timings of the next cycle and the following cycles are advanced with respect to the present value. According to the control of the ignition timing like this, the ignition timing is advanced as much as possible while occurrence of knock is allowed within an allowable level, whereby fuel efficiency performance and output performance of the internal combustion engine 10 can be extracted more effectively.

(Correction of Knock Determination Threshold Value J Based on Integrated Intensity of Knock Determination Signal)

FIG. 3 is a diagram showing a waveform of an output signal from the in-cylinder pressure sensor 26 after passing through the HPF 36. More specifically, FIG. 3 shows an output signal waveform at a time of occurrence of knock in the above described gate range for calculating knock intensity. On the output signal from the in-cylinder pressure sensor 26, the gas column vibration in the cylinder is superimposed as noise as shown in FIG. 3, and the gas column vibration becomes a main noise source.

FIGS. 4A and 4B are diagrams showing frequency distributions of the knock intensities. More specifically, FIGS. 4A and 4B each shows, for each of cylinders #1 to #4, the frequency distribution showing a relation of knock intensity in a predetermined plurality of N cycles (for example, several hundred to several thousand cycles) and a calculated frequency (degree) of each knock intensity.

FIG. 4A shows a frequency distribution at a time when knock has not occurred. From FIG. 4A, it is found that the frequency distributions of the knock intensities vary among the cylinders due to an influence of occurrence of noise (the aforementioned gas column vibration) varying among the cylinders. In the cycle in which knock has occurred, the knock intensity is calculated as a large value. Therefore, as shown in FIG. 4B, the frequency distribution at the time of occurrence of knock becomes a distribution that is skewed to a larger degree to a side of a high knock intensity, as compared with the frequency distribution (FIG. 4A) at the time of non-occurrence of knock. With respect to the frequency distribution at the time of knock occurrence, variations occur among the cylinders due to the influence of the above described noise.

As the knock determination method using a knock sensor that directly detects vibration of an engine block, there is known a knock determination method that uses a frequency distribution showing a relation between an intensity value of vibration that is calculated based on the output signal of the knock sensor and a calculation frequency of each of the intensity values. In this method, a knock determination threshold value is set with a median value of the frequency distribution as a reference. However, the aforementioned method cannot be said as suitable for the knock determination which uses the in-cylinder pressure sensor 26 which receives the influence of noise by the gas column vibration. That is to say, as shown in FIGS. 4A and 4B, the frequency distribution is varied due to the influence of the above described noise, whereby the median values of the knock intensities on the frequency distributions of the respective cylinders also vary among the cylinders. Further, the dynamic range of an in-cylinder pressure sensor is generally smaller than the dynamic range of a knock sensor. Therefore, the in-cylinder pressure sensor is more susceptible to the influence of electric noise as compared with the knock sensor, and this also becomes the factor that makes the median value of the frequency distribution easily variable.

Therefore, in the present embodiment, a knock intensity at a 97% point intensity or more in a target knock level is extracted from the knock intensities that are calculated at each cycle during continuous N cycles in the same cylinder, and an integrated value of the extracted knock intensities is calculated as an "integrated intensity". Hereinafter, the integrated intensity which is calculated like this will be described as an "actual integrated intensity". Subsequently, a base value of the knock determination threshold value J is corrected so that the difference between the actual integrated intensity and a target integrated intensity which is a target value of the actual integrated intensity becomes small. A correction process of the knock determination threshold value J will be described in detail as follows with reference to the block diagram in FIG. 2.

As shown in FIG. 2, the ECU 30 further includes a knock intensity integration section 48, an integrated intensity comparison section 50, a correction amount calculation section 52 and an addition section 54. The knock intensity integration section 48 extracts, at each continuous N cycle, knock intensities which are equal to or larger than the 97% point intensity (corresponding to a "predetermined knock intensity threshold value" in the present application) in the target knock level from the knock intensities which are calculated by the knock intensity calculation section 42 at the respective cycles. Subsequently, the knock intensity integration section 48 calculates the actual integrated intensity concerning the extracted knock intensities.

Figure 5:
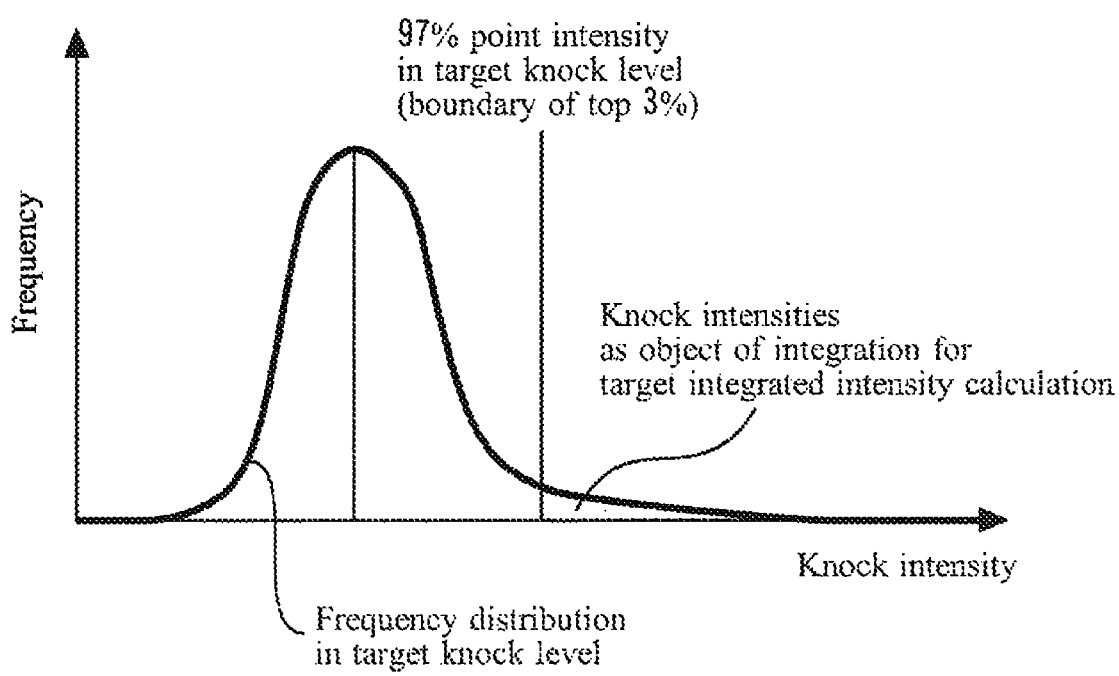
FIG. 5 is a diagram showing a frequency distribution of knock intensities in N cycles at a time of an internal combustion engine being operated in a state in which an actual knock level is a target knock level.

Here, a setting method of the target integrated intensity will be described with reference to FIG. 5. FIG. 5 is a diagram showing a frequency distribution of knock intensities in N cycles at a time of the internal combustion engine 10 being operated in a state in which an actual knock level is the target knock level. The knock level mentioned here refers to a value based on the knock intensity and a knock frequency. The knock frequency mentioned here refers to an occurrence frequency of knock that is determined as knock by the knock determination section 46 during the N cycles. More specifically, the knock level becomes larger as the knock intensities of knocks that occur in the N cycles are higher. Further, the knock level becomes larger as the knock frequency in the N cycles is higher. The frequency distribution in the target knock level shown in FIG. 5 is calculated based on measurement data in the N cycles in a state in which the knock intensity and the knock frequency correspond to the target knock level. The above described "97% point intensity in the target knock level" corresponds to a knock intensity in a boundary of top 3% out of the knock intensities that are included in the frequency distribution shown in FIG. 5. The target integrated intensity corresponds to a value that is calculated as the integrated value of the knock intensities that are equal to or larger than the 97% point intensity in the frequency distribution shown in FIG. 5 (that is, the knock intensity in the boundary of the top 3% out of the knock intensities included in the frequency distribution). The ECU 30 stores the target integrated intensity and the 97% point intensity which are adapted in the target knock level in advance. The target knock level itself is determined in advance by considering the specifications of the internal combustion engine 10, the specifications of a vehicle loaded with the internal combustion engine 10 and the like.

The integrated intensity comparison section 50 compares the actual integrated intensity which is calculated by the knock intensity integration section 48 and a predetermined target integrated intensity. More specifically, the integrated intensity comparison section 50 calculates the difference between the actual integrated intensity and the target integrated intensity and outputs the difference to the correction amount calculation section 52. As a correction amount for the knock determination threshold value J, the correction amount calculation section 52 calculates a value corresponding to the difference which is calculated by the integrated intensity comparison section 50. When the actual integrated intensity is larger than the target integrated intensity, the integrated intensity comparison section 50 calculates a correction amount (a negative correction amount) for making the knock determination threshold value J small. When, on the other hand, the actual integrated intensity is smaller than the target integrated intensity, the integrated intensity comparison section 50 calculates a correction amount (a positive correction amount) for making the knock determination threshold value J large. The addition section 54 adds the calculated correction amount to the base value of the knock determination threshold value J, and outputs, to the knock intensity comparison section 44, the final knock determination threshold value J that is a value after the addition. The base value of the knock determination threshold value J is adapted in advance as a value corresponding to the specifications of the internal combustion engine 10 and the like.

According to the processing of the integrated intensity comparison section 50, the correction amount calculation section 52 and the addition section 54 which are described above, the knock determination threshold value J is made small when the actual integrated intensity is larger than the target integrated intensity, whereby knock is more easily detected as compared with a case before correction. Accordingly, the ignition timing is likely to be retarded (that is, knock occurrence is suppressed more), and therefore, an action to reduce the knock level occurs. As a result, the actual integrated intensity can be brought close to the target integrated intensity. When the actual integrated intensity is smaller than the target integrated intensity, the knock determination threshold value J is made large, whereby knock becomes more difficult to detect as compared with a case before correction. Accordingly, the ignition timing becomes difficult to be retarded (that is, knock occurrence is allowed more), and therefore, an action to raise the knock level occurs. As a result, in this case, the actual integrated intensity can be also brought close to the target integrated intensity.

As described above, according to the above described processing, the knock determination threshold value J can be corrected so that the actual integrated intensity and the target integrated intensity coincide with each other during an operation of the internal combustion engine 10. As a result, the knock levels of the respective cylinders can be matched with the target knock level. As described above, in the internal combustion engine 10 which includes the in-cylinder pressure sensors 26 in the respective cylinders, internal information of the respective cylinders can be individually obtained, and therefore, the above described processing can be executed for each of the cylinders. Consequently, the actual integrated intensities of the respective cylinders can be matched with the target integrated intensity, as a result of which, the knock levels of the respective cylinders can be matched with the target knock level. In addition, according to the method of the present embodiment, the knock determination with high precision, can be performed, which uses the parameter that can quantify a targeted knock level (that is, the above described integrated intensity of the knock determination signal) while favorably separating knock components from noise components, as will be described in detail hereunder. Further, as will be described in detail hereunder, the number of adaptation steps for knock determination in the respective cylinders can be suppressed.

That is to say, when knock has occurred, the knock intensity which is calculated becomes large. Therefore, by using the knock intensity which is located in a high rank in the frequency distribution of the knock intensity, the noise components that are caused by, for example, the gas column vibration and the knock components can be favorably separated from each other. The knock level is an index that is set based on the knock intensity and the knock frequency as already described (more specifically, the index which is set to be higher as the knock intensity is larger and the knock frequency is higher). Further, the actual integrated intensity refers to a value that is calculated by adding up knock intensities located in the high rank in the frequency distribution of the knock intensity, and is calculated as a value that increases with an increase in the knock level (more specifically, a value that increases with an increase in one or both of the knock intensity and the knock frequency). Therefore, according to the actual integrated intensity as above, a parameter that is correlated with the knock level (in other words, that can quantify the knock level) can be obtained for knock determination while the influence of noise is favorably excluded. Thereby, accurate knock determination is enabled. By performing ignition timing control while correcting the knock determination threshold value J so that the actual integrated intensity becomes the target integrated intensity, the knock level can be controlled to be the target knock level with high precision. Here, concerning the knock intensity in the boundary of what percentage of a top knock intensity out of the knock intensities included in the frequency distribution in the target knock level should be used as the lower limit of the knock intensities for use in calculation of the actual integrated intensity, the knock intensity that enables to calculate of the integrated intensity as the value which is correlated with the knock level can be adopted. However, the lower limit of the knock intensities that are an object of integration is preferably a boundary of a predetermined percentage within a range from a top 3% to 5% inclusive, including the boundary of the top 3% shown as one example in the present embodiment. The reason is as follows. As the parameter for use in correction of the knock determination threshold value J, the integrated intensity relating to the knock intensities obtained at each of cycles in the plurality of cycles is used instead of the knock intensity obtained in one cycle, whereby variations in the parameter among the cylinders can be reduced. However, when the number of knock intensities that is an object of integration is too small as in the case of the boundary at top 1% being adopted for example, variations among the cylinders in the actual integrated intensity become large because the actual integrated intensity is susceptible to the influence of the variations of the knock intensities that are calculated in the respective cylinders. Conversely, when the number of knock intensities that is an object of integration is too large as in the case of the boundary at top 10% being adopted for example, the actual integrated intensity is susceptible to the influence of the noise components. Therefore, an S/N ratio is worsened, and distinguishing the knock levels becomes difficult. With these points taken into consideration, a range from top 3% through top 5% is preferable.

Further, for the reason of adherence of deposit to the wall surface of the combustion chamber 14 over time and the like, easiness of knock occurrence may change. This does not always bring about the same change to the respective cylinders, and easiness of knock occurrence may vary among the cylinders. According to the processing of the present embodiment which corrects the knock determination threshold value J so that the actual integrated intensity coincides with the target integrated intensity, a larger correction amount (a negative correction amount) is added to the base value of the knock determination threshold value J in a cylinder where knock occurs relatively easily in order to suppress knock more, as compared with the other cylinders. Accordingly, even in the situation where easiness of knock occurrence differs among the cylinders due to, for example, the influence of change with the passage of time, if one target integrated intensity common to all the cylinders is set, the actual integrated intensities in the respective cylinders can be matched with the target integrated intensity, and the knock levels of the respective cylinders can be matched with the target knock level. Consequently, the number of adaptation steps can be suppressed.

Figure 6:
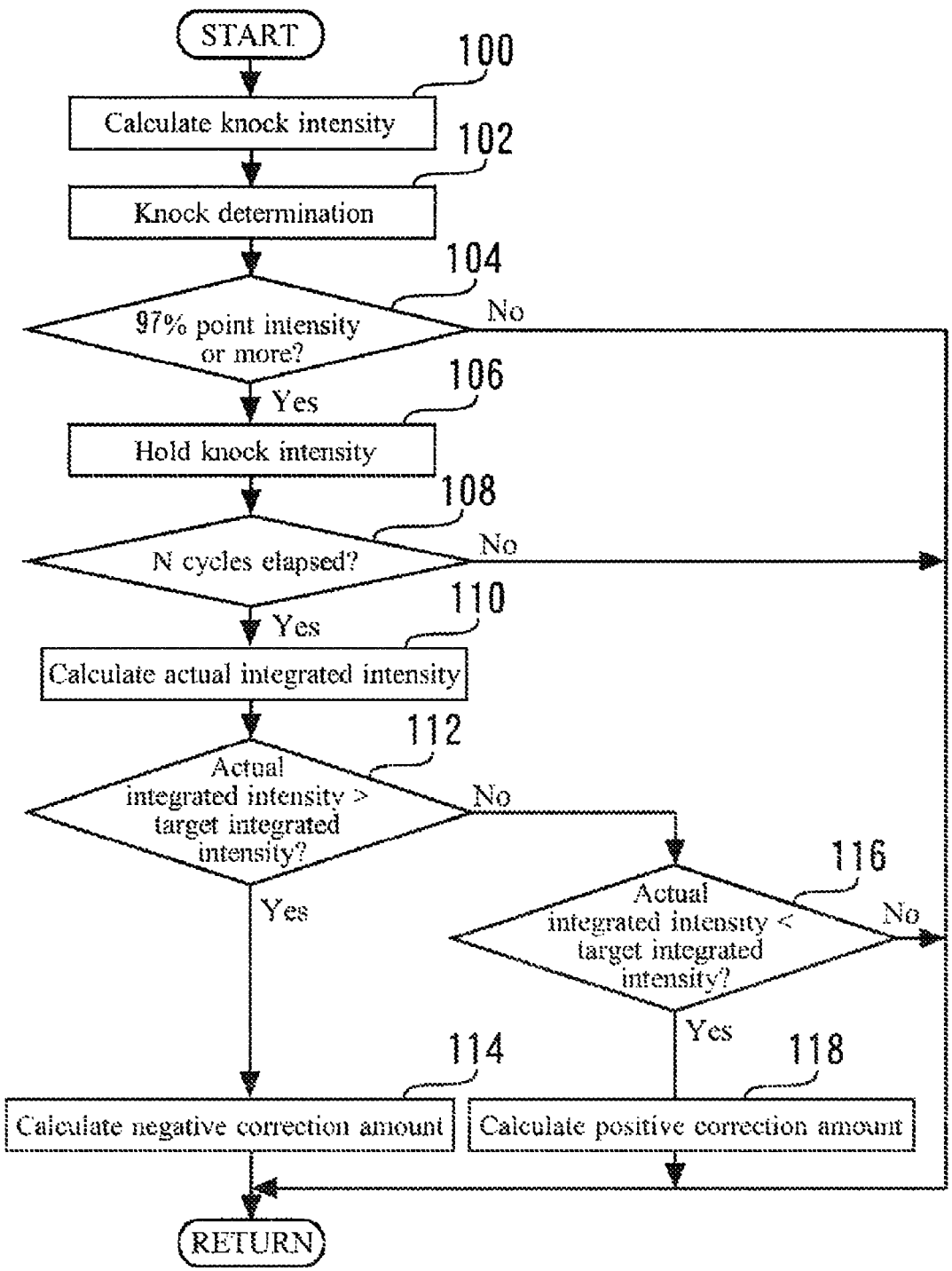
FIG. 6 is a flowchart of a routine that is executed in the embodiment of the present invention.

FIG. 6 is a flowchart showing a knock determination processing routine in the embodiment of the present invention. The present routine is repeatedly executed at each cycle in a predetermined timing after the end of combustion in the respective cylinders.

In the routine shown in FIG. 6, the ECU 30 firstly executes a process in step 100. The process in step 100 is a process which is carried out by the knock intensity calculation section 42. In step 100, the peak value of the intensity in the gate range of the knock determination signal (the signal converted into an absolute value) after passing through the BPF 40 is calculated as the knock intensity.

Next, the ECU 30 proceeds to step 102. A process in step 102 is a process carried out by the knock intensity comparison section 44 and the knock determination section 46. In step 102, presence or absence of occurrence of knock is determined based on whether or not the knock intensity which is calculated in step 100 is larger than the present knock determination threshold value J. In accordance with the knock determination result, the control of the ignition timing is executed in accordance with necessity as already described.

Next, the ECU 30 proceeds to step 104. Processes in steps 104 to 110 are processes that are carried out by the knock intensity integration section 48. In step 104, it is determined whether or not the knock intensity which is calculated in step 100 is the knock intensity that corresponds to the intensity at the 97% point or higher in the target knock level. When the determination in the present step 104 is not established as a result, the processing for the current cycle is ended, whereas when the present determination is established, the knock intensity calculated in the current cycle is temporarily stored and held in a buffer of the ECU 30 (step 106).

Next, in step 108, it is determined whether or not the N cycles has elapsed after the cycle in which the latest calculation of the actual integrated intensity has been performed. When the determination in the present step 108 is not established as a result, the processing for the current cycle is ended, whereas when the present determination is established, that is, when it can be determined that calculation of the knock intensities for the N cycles has been completed, the actual integrated intensity for the present N cycles is calculated by integrating the knock intensities held in step 106 (step 110). With this, the above described buffer is cleared.

Next, the ECU 30 proceeds to step 112. Processes in steps 112 to 116 are processes that are carried out by the integrated intensity comparison section 50, the correction amount calculation section 52 and the addition section 54. In step 112, it is determined whether or not the actual integrated intensity calculated in step 110 is larger than the target integrated intensity. When the actual integrated intensity is larger than the target integrated intensity as a result, a negative correction amount is calculated to make the knock determination threshold value J small, and the correction amount is added to the base value of the knock determination threshold value J (step 114). The magnitude itself of the correction amount may be a fixed value that is adapted in advance, or may be a value that is set in advance as a value that becomes larger (to a negative side) as the difference between the actual integrated intensity and the target integrated intensity is larger.

When the determination in the above described step 112 is not established, it is next determined whether or not the actual integrated intensity is smaller than the target integrated intensity (step 116). When the determination in the present step 116 is not established as a result, that is, when the actual integrated intensity and the target integrated intensity are equal to each other, correction of the knock determination threshold value J is not performed. When the present determination is established, a positive correction amount is calculated to make the knock determination threshold value J large, and the correction amount is added to the base value of the knock determination threshold value J (step 118). The setting of the magnitude of the correction amount in the present step 118 is similar to the setting of the magnitude of the correction amount in step 114.

The invention claimed is:

1. A knock determination apparatus for an internal combustion engine including an in-cylinder pressure sensor that is installed in each cylinder and detects an in-cylinder pressure,
   wherein the knock determination apparatus is configured to:
   calculate a knock intensity that is a signal intensity in a predetermined frequency band including a knock frequency band, based on an output signal from the in-cylinder pressure sensor in a predetermined crank angle range;
   determine that when the knock intensity calculated by the knock determination apparatus is larger than a knock determination threshold value, knock has occurred;
   calculate an integrated intensity that is an integrated value of knock intensities that are equal to or larger than a predetermined knock intensity threshold value among knock intensities that are calculated at respective cycles during a predetermined plurality of cycles in a same cylinder; and
   correct the knock determination threshold value so that a difference between the integrated intensity calculated by the knock determination apparatus and a target integrated intensity decreases,
   wherein the predetermined knock intensity threshold value is a knock intensity in a boundary of a top predetermined percentage out of knock intensities included in a frequency distribution showing a relation between the knock intensities acquired in the predetermined plurality of cycles when the internal combustion engine is operated in a state in which a knock level specified in accordance with the knock intensity and the knock frequency is a target knock level, and the target knock level is calculated based on a frequency of the respective knock intensity,
   wherein the target integrated intensity is an integrated value of knock intensities that are equal to or larger than the knock intensity threshold value that are extracted from the knock intensities which are acquired in the predetermined plurality of cycles when the internal combustion engine is operated in the state in which the knock level is the target knock level, and
   wherein the difference between the integrated intensity and the target integrated intensity corresponds to a correction amount for correcting the knock determination threshold value.

2. The knock determination apparatus according to claim 1,
   wherein when the integrated intensity is larger than the target integrated intensity, the knock determination apparatus is configured to decrease the knock determination threshold value.

3. The knock determination apparatus according to claim 1,
   wherein when the integrated intensity is smaller than the target integrated intensity, the knock determination apparatus is configured to increase the knock determination threshold value.

4. The knock determination apparatus according to claim 1,
   wherein the top predetermined percentage is in a range from a top 3 percent through a top 5 percent.

* * * * *